Jan. 6, 1925.
C. MARTIN
POTATO GATHERER
Filed March 30, 1923
1,521,698
5 Sheets-Sheet 3
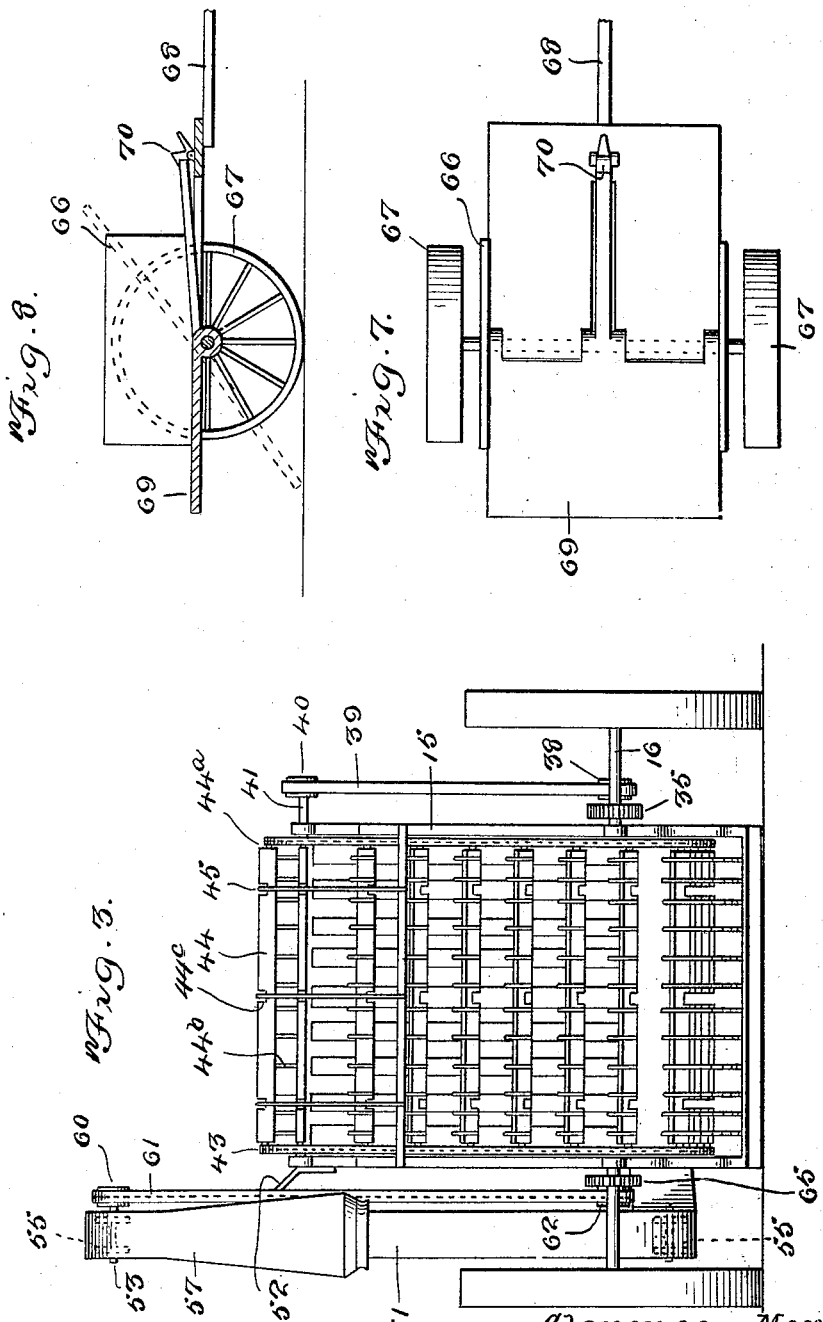

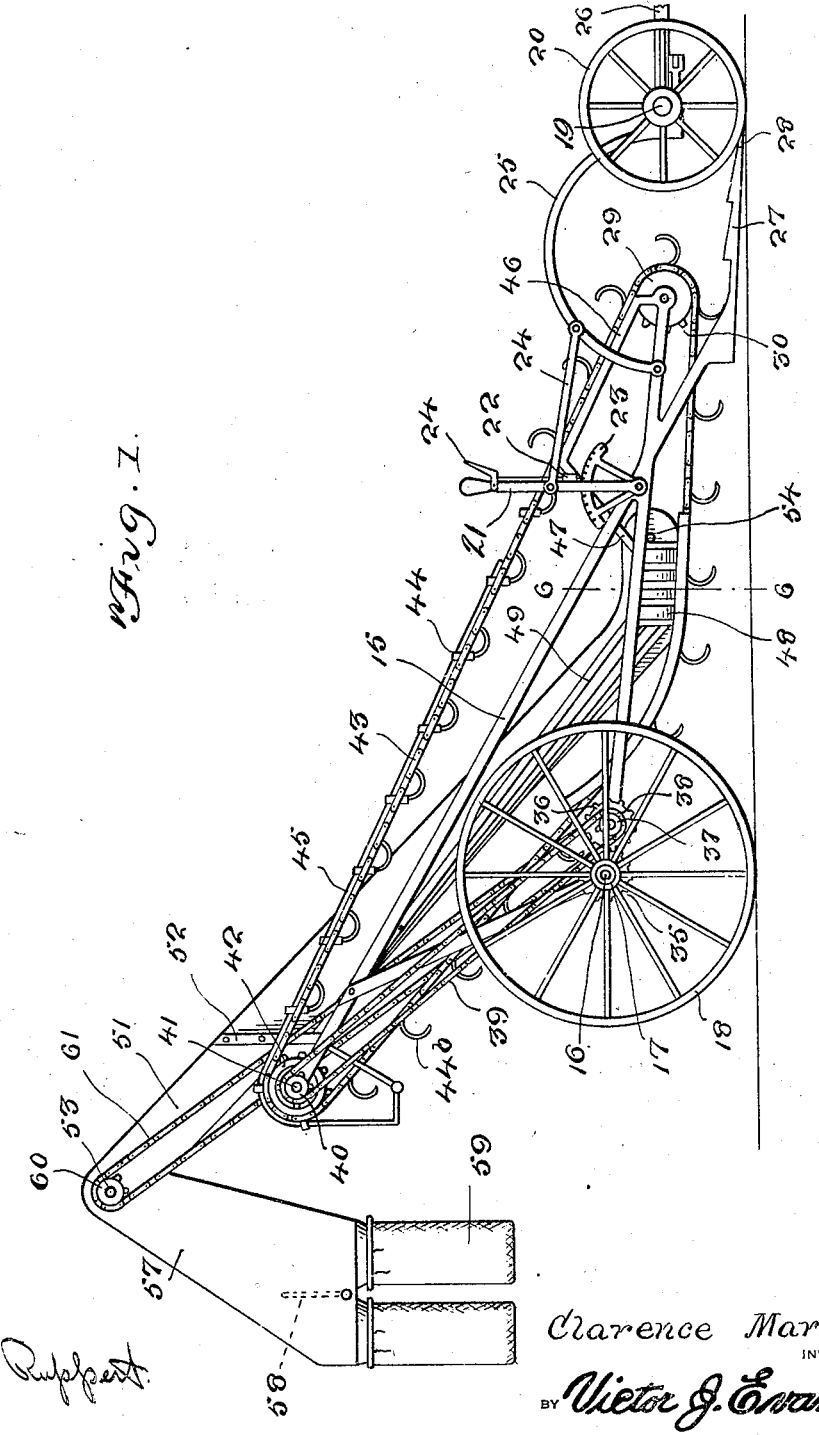

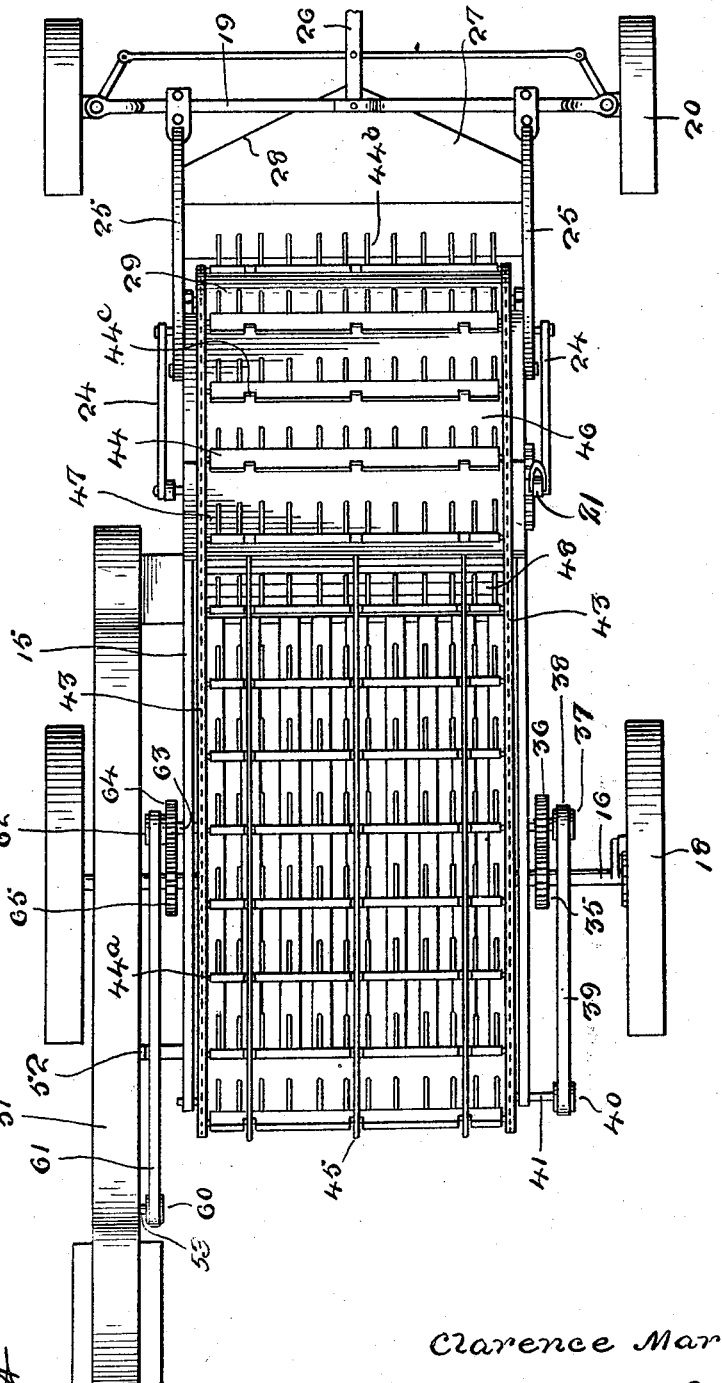

Jan. 6, 1925.　　　　　　　　　　　　　　　　　　1,521,698
C. MARTIN
POTATO GATHERER
Filed March 30, 1923　　　5 Sheets-Sheet 4
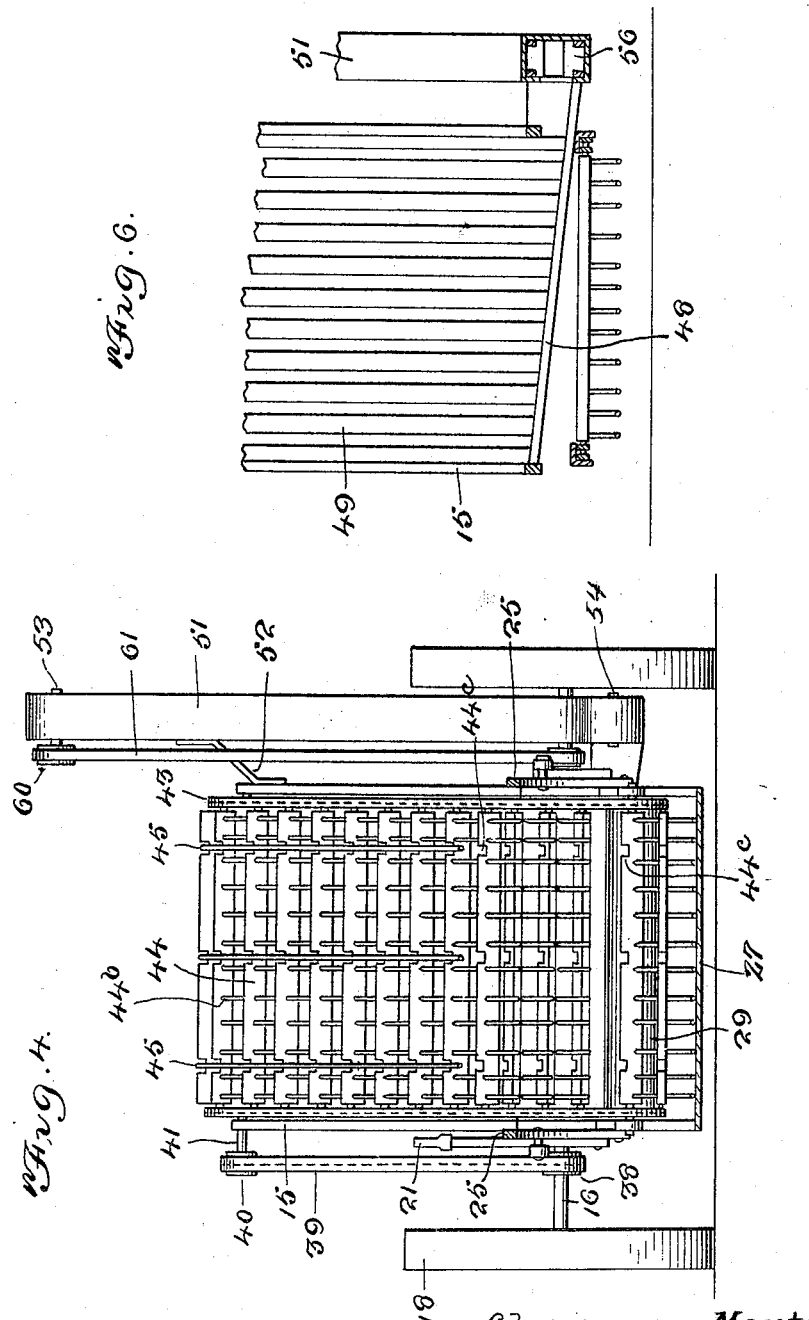

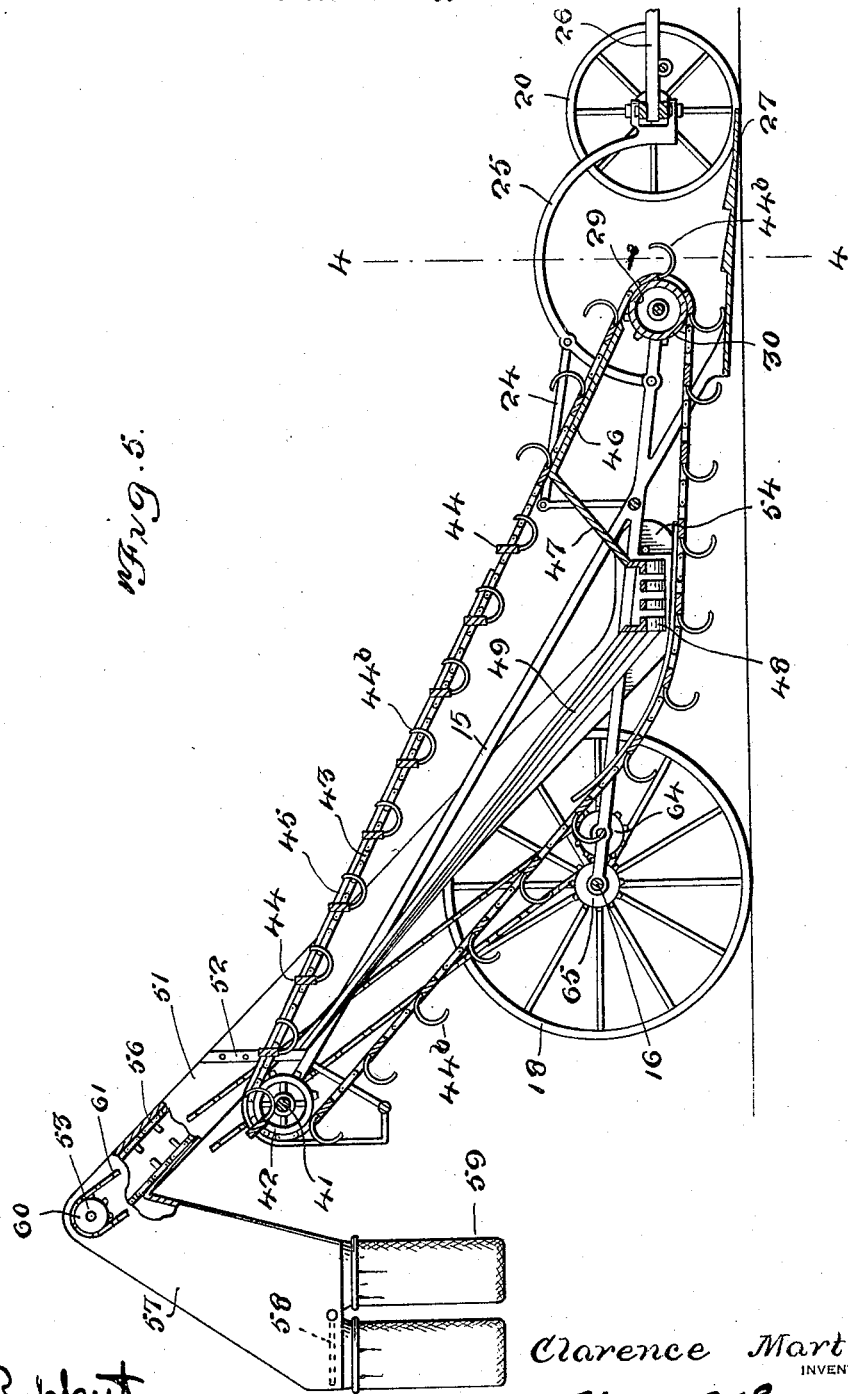

Patented Jan. 6, 1925.

1,521,698

UNITED STATES PATENT OFFICE.

CLARENCE MARTIN, OF HUNTER, NORTH DAKOTA.

POTATO GATHERER.

Application filed March 30, 1923. Serial No. 628,855.

*To all whom it may concern:*

Be it known that I, CLARENCE MARTIN, a citizen of the United States, residing at Hunter, in the county of Cass and State of North Dakota, have invented new and useful Improvements in Potato Gatherers, of which the following is a specification.

This invention relates to harvesting machinery and has for its object the provision of a novel machine designed to be drawn along the ground for the purpose of gathering and sacking potatoes which have been previously dug and left lying upon the ground the requisite time to effect curing or drying.

An important object is the provision of a machine of this character provided with means for separating the potatoes from the vines or other vegetable matter which may be gathered up along with the potatoes, means being provided for discharging the vines and the like onto the ground while the potatoes are sifted and passed to the sacking mechanism.

In the actual carrying out of the invention it is preferable to employ a trailer cart drawn behind the machine and holding the potatoes as they are sacked, the cart being capable of being dumped at intervals to get rid of the load of sacks.

An additional object is the provision of a machine of this character which involves several novel structural details of transmission and arrangement, which will be comparatively simple in construction, easy to operate, efficient and durable in service and a general improvement in the art.

With the above and other objects and advantages in view the invention consists in the details of construction to be hereinafter more fully described and claimed and illustrated in the accompanying drawings, in which:

Figure 1 is a side elevation of the device,
Figure 2 is a top plan view thereof,
Figure 3 is a rear elevation,
Figure 4 is a section on the line 4—4 of Figure 5,
Figure 5 is a longitudinal section,
Figure 6 is a cross section taken along the chute,
Figure 7 is a plan view of a dump cart used as an auxiliary to the machine and
Figure 8 is a side elevation thereof.

Referring more particularly to the drawings, the numeral 15 designates the supporting frame of the device, this frame being constructed preferably of angle or channel iron and consisting of any suitable number of bars properly arranged and secured together. This frame is supported upon an axle 16 which is rotatably mounted in suitable bearings 17 and which carries ground engaging wheels 18. The forward end of the frame is supported by an axle 19 carrying ground engaging wheels 20. The construction of this front axle is peculiar and the frame is supported therefrom or connected therewith in such a way that by manipulating a control lever 21 having a grip released pawl 22 co-operating with a notched segment 23 the front axle may be rocked for varying the height of the forward end of the frame with respect to the ground, the lever being connected with the front axle by links 24 connected with members 25 which are in turn connected with the front axle. The purpose of raising the front end is for transporting the device from place to place or when running idle under other conditions. It should of course be mentioned that a suitable draft tongue or draw bar connection 26 is provided whereby the device may be pulled along and if preferred a steering mechanism might be provided for turning the front wheels so that the device will accurately follow rows of potatoes to be picked up. It is also well to state that one of the rear wheels 18 must have a pawl and ratchet connection with the axle 16 so as to permit the necessary retardation of movement or acceleration when turning corners.

Secured at the forward end of the frame is a species of collecting shoe 27 which may be formed of sheet metal or other material and which has a suitably shod forward edge 28. Journaled across the front end of the frame rearwardly of this shoe is a roller 29 over which operates the gathering mechanism to be described, which mechanism is for the purpose of picking up the potatoes and vines scooped up by the shoe and carrying this matter rearwardly to the remainder of the mechanism. The ends of this roller 29 carry idle sprockets 30 for a purpose to be described.

Mounted upon the back axle 16 are gears 35 which mesh with other gears 36 on a countershaft 37 suitably mounted on the frame 15 and carrying sprockets 38 about which are trained chains 39 which extend rearwardly and which are engaged about sprockets 40 on a shaft 41 journaled at the rear of the machine. This shaft 41 carries other sprockets 42 about which are trained forwardly and downwardly extending conveyor chains 43 which are provided with transverse bars 44, of peculiar construction, which define a conveyor. The bars 44 may be of angle iron or other formation and are provided at their ends with trunnions $44^a$ pivotally connected with the chains 43 whereby the bars will be capable of turning over. These bars carry curved gathering fingers $44^b$ and at points throughout their lengths the bars are cut away as shown at $44^c$ for a purpose to be described. At the rear end of the frame I provide longitudinally extending rods 45 which are located above the conveyor formed by the chains 43 and bars 44 and which are for the purpose of preventing the vines and grass from slipping through the conveyor. The conveyor chains 43 are trained about the idle sprockets 30. The cut out places $44^c$ are to accommodate the rods 45 which lie therein.

Secured near the forward portion of the frame and located beneath the conveyor is a slatted platform 46 which has its rear end leading in an inclined drop 47 which extends to a transverse inclined chute 48 which is likewise slatted. Leading from the rear side of this chute to the rear end of the frame are longitudinally extending rods or slats 49, which are for the purpose of conducting back to the chute any potatoes which are carried over by the vines and which are subsequently dropped therefrom.

Mounted at one side of the main frame and extending upwardly and rearwardly is an elevator structure including an elongated casing 51 braced as shown at 52 and having its lower end formed with an opening into which the smaller end of the chute 48 leads. Journaled at the upper and lower ends of this casing are shafts 53 and 54 respectively which carry sprockets 55 about which are trained slatted conveyor chains 56. Extending downwardly from the rear end of this conveyor casing is a discharge spout 57 at the outlet end of which is pivoted a gate 58. It is designed that sacks 59 be placed below the bottom of this spout and held thereon by any suitable means. By swinging the gate 58 in one direction or the other either desired sack may be filled. The means for driving this conveyor consist of a sprocket 60 on the shaft 53 about which is trained a chain 61 which is in turn trained about a sprocket 62 on a countershaft 63 journaled across the frame and carrying a pinion 64 meshing with a pinion 65 on the axle 16.

In the operation, the device is drawn along the ground by any suitable means, preferably a team of horses or a tractor. The rotation of the wheels 18 will cause all the shafts to be rotated owing to the transmission which includes the sprockets and chain connections and the gearing. As the ground engaging wheels 18 rotate, the drive connections cause the conveyor chains 43 to travel forwardly at their lower stretch and rearwardly along their upper stretch. As the lower stretch approaches, the roller 29 and the successive bars 44 engage against the periphery of the roller and the bars are consequently held rigid and prevented from any pivotal movement with respect to their supporting chains. At this time the fingers $44^b$ carried by the bars will be arranged in a scoop like position and will gather up the potatoes, vines etc. and conduct this matter rearwardly along the upper stretch. After leaving the platform 46, there is then nothing to hold the bars 44 rigid and as a consequence they swing with respect to their supporting chains and permit the potatoes and other matter to drop onto the slatted bottom 49. Small stones, dirt and the like will of course sift through and owing to the more or less agitating effect produced the potatoes will be shaken off from the vines and will drop between the slats on to the drop 47 and roll into the chute 48. Potatoes adhering to the vines for a greater length of time will eventually be shaken off before reaching the rear end of the machine and will fall onto the slatted platform 49 and be conducted to the chute. The vines, grass and the like will be discharged at the rear end of the conveyor and fall onto the ground. The potatoes accumulating within the chute 48 will roll into the conveyor casing 51 through the opening 53. The upward and rearward movement of the conveyor 56 will cause the potatoes to be carried up and discharged into the spout 57 from which they will be fed into the sacks 59.

It is of course conceivable that an ordinary wagon may travel along behind or to one side of the device and into which the sacked potatoes are placed, though in actual practice I prefer to use the trailing cart indicated in Figures 7 and 8 this cart including a rectangular body 66 mounted upon wheels 67 and having a draft tongue 68 suitably connected with the rear of the machine. The tail gate or back of this cart indicated by the numeral 69 is adapted to be dropped when desired by releasing a trip mechanism 70 so that when the cart is full of sacks of potatoes they may be allowed to dump out onto the ground without necessitating stopping traveling of the machine.

From the foregoing description and a study of the drawings it will be apparent that I have thus provided a simply constructed and consequently inexpensive machine which will be highly efficient in gathering up and subsequently sacking potatoes which are left lying upon the ground after they are dug by an ordinary potato digger. It is to be noted that all the parts of the device are positively driven and it is furthermore to be observed that the mechanism is comparatively simple and that it should not get out of order under ordinary usage.

While I have shown and described the preferred embodiment of the invention it is of course to be understood that I reserve the right to make such changes in the form, construction and arrangement of parts as will not depart from the spirit of the invention or the scope of the subjoined claims.

Having thus described my invention I claim:

1. A machine of the character described comprising a wheel supported frame, a gathering scoop at the forward end thereof, a roller journalled rearwardly of said scoop, a slatted bottom for the frame having a drop at its intermediate portion leading to a transverse inclined chute, an elevator conveyor receiving from said chute and a conveyor trained about said roller receiving from said scoop and traveling above said bottom.

2. A machine of the character described comprising a wheel supported frame, a gathering scoop at the forward end thereof, a roller journaled rearwardly of said scoop, a slatted bottom for the frame having a drop at its intermediate portion leading to a transverse inclined chute, an elevator conveyor receiving from said chute and a conveyor trained about said roller receiving from said scoop and traveling above said bottom, and gathering fingers carried by said conveyor.

3. A machine of the character described comprising a wheel supported frame, a gathering scoop at the forward end thereof, a roller journaled rearwardly of said scoop, a slatted bottom for the frame having a drop at its intermediate portion leading to a transverse inclined chute, an elevator conveyor receiving from said chute and a conveyor trained about said roller receiving from said scoop and traveling above said bottom, said conveyor consisting of supporting chains, transverse bars carried thereby, and curved gathering fingers carried by said bars.

4. A machine of the character described comprising a wheel supported frame, a gathering scoop at the forward end thereof, a roller journaled rearwardly of said scoop, a slatted bottom for the frame having a drop at its intermediate portion leading to a transverse inclined chute, an elevator conveyor receiving from said chute and a conveyor trained about said roller receiving from said scoop and traveling about said bottom, said conveyor including supporting chains, bars pivotally connected therewith and carrying curved normally depending gathering fingers, engagement of said bars with said roller holding the fingers in active position.

5. A machine of the character described comprising a wheel supported frame, a gathering scoop at the forward end of the frame, a slatted bottom for the frame having a drop at its intermediate portion leading to a transverse inclined chute, a rearwardly traveling slatted conveyor leading from a point rearwardly of said scoop to the rear of the frame, and an elevator conveyor at one side of the frame receiving from said chute, means for driving all the conveyors, and means for varying the position of the front end of the frame to vary the height thereof above the ground.

6. In a machine of the character described comprising a wheel supported frame, a gathering scoop at the forward end of the frame, a slatted bottom for the frame having a drop at its intermediate portion leading to a transverse inclined chute, a rearwardly traveling slatted conveyor leading from a point rearwardly of said scoop to the rear of the frame, and an elevator conveyor at one side of the frame receiving from said chute, said elevator conveyor consisting of a casing having a slat carrying elevator chain therein, said casing having an outlet spout, and a gate movable within the spout for controlling the discharge of potatoes therethrough.

7. In a machine of the character described, a frame, supporting wheels therefor, a slatted bottom in the frame having a drop and leading into a laterally disposed inclined chute, a conveyor mechanism operating above the bottom, an elevator conveyor leading from said chute and means at the forward end of the frame for gathering up potatoes and vines lying upon the ground.

8. In a machine of the character described, a frame, supporting wheels therefor, a slatted bottom in the frame having a drop and leading into a laterally disposed inclined chute, a conveyor mechanism operating above the bottom, an elevator conveyor leading from said chute and means at the forward end of the frame for gathering up potatoes and vines lying upon the ground, said means consisting of a roller, a shoe at the forward end of the frame in advance of said roller, a pair of driven chains trained about the roller, bars pivoted on the chains, gathering fingers carried by the bars, means for holding the fingers in gathering position, and means for periodically releasing said holding means.

In testimony whereof I affix my signature.

CLARENCE MARTIN.